US006457306B1

(12) United States Patent
Abel et al.

(10) Patent No.: US 6,457,306 B1
(45) Date of Patent: Oct. 1, 2002

(54) ELECTRICAL DRIVE SYSTEM FOR ROCKET ENGINE PROPELLANT PUMPS

(75) Inventors: Terry M. Abel; Thomas A. Velez, both of Huntsville, AL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/712,778

(22) Filed: Nov. 13, 2000

Related U.S. Application Data

(62) Division of application No. 09/097,354, filed on Jun. 15, 1998, now abandoned.

(51) Int. Cl.[7] .................................................. F02K 9/46
(52) U.S. Cl. ............................. 60/204; 60/257; 417/16; 417/423.6; 417/362
(58) Field of Search .......................... 60/204, 257, 258, 60/259, 260; 417/1, 15, 16, 423.6, 423.5, 362; 415/122.1, 124.1; 310/112

(56) References Cited

U.S. PATENT DOCUMENTS

| | | | |
|---|---|---|---|
| 2,180,144 A | * 11/1939 | Gieseler ...................... 417/16 |
| 2,561,131 A | * 7/1951 | Oropeza ...................... 310/112 |
| 2,646,205 A | * 7/1953 | Rosenchold ................. 417/16 |
| 2,713,243 A | * 7/1955 | Seaver ......................... 60/257 |
| 2,936,107 A | * 5/1960 | Blackburn .................... 417/16 |
| 3,002,340 A | * 10/1961 | Landerman ................... 60/260 |
| 3,017,745 A | 1/1962 | Shirley et al. |
| 3,021,671 A | * 2/1962 | Wallach ........................ 60/257 |
| 3,040,522 A | 6/1962 | Williamson et al. |
| 3,048,969 A | 8/1962 | Horner |
| 3,082,600 A | 3/1963 | Williamson et al. |
| 3,088,406 A | 5/1963 | Horner |
| 3,110,154 A | * 11/1963 | Edelbaum et al. ............ 60/257 |
| 3,178,884 A | 4/1965 | Boardman, Jr. |
| 3,224,189 A | 12/1965 | Kenny |
| 3,229,459 A | * 1/1966 | Cervenka ..................... 60/257 |
| 3,453,828 A | 7/1969 | Rawlings |
| 3,479,818 A | 11/1969 | Strobl |
| 3,516,251 A | 6/1970 | Andrews et al. |
| 4,803,390 A | * 2/1989 | Bertram et al. ............. 310/112 |
| 4,900,231 A | * 2/1990 | Kennedy ...................... 417/16 |
| 5,043,617 A | * 8/1991 | Rostron .................... 417/423.6 |
| 5,328,036 A | * 7/1994 | Douglas .................. 209/366.5 |
| 5,407,331 A | * 4/1995 | Atsumi ........................ 417/420 |
| 5,838,135 A | * 11/1998 | Satake et al. ................ 318/112 |

FOREIGN PATENT DOCUMENTS

DE 0830160 * 1/1952 .............. 417/423.5

* cited by examiner

Primary Examiner—Ted Kim
(74) Attorney, Agent, or Firm—Marsh Fischmann & Breyfogle LLP

(57) ABSTRACT

A liquid propellant supply system (10) according to the invention is electrical in nature and avoids the need for a gas generator and a turbine assembly. In particular, the system (10) includes an electrical power source (12), a controller (14) and a motor (18) for driving the pump (20). The electrical power source (12) provides electrical power sufficient for high power, limited duration applications such as for launch vehicle applications. For launch vehicle applications, the power source (12) is preferably capable of providing very high power for at least 60 seconds. A number of different types of electrical power sources may be employed in this regard. For example, the power source (12) may include high energy density batteries, supercapacitors, or counter rotating flywheels. Multiple counter rotating motors may be employed in order to minimize precessional forces. The invention thereby eliminates problematic high pressure plumbing, reduces overall mass and allows for convenient mass flow rate throttling, as well as safe abort options.

22 Claims, 6 Drawing Sheets

ELECTRICAL DRIVE SYSTEM FOR ROCKET ENGINE PROPELLANT PUMPS

CROSS-REFERENCE TO RELATED APPLICATIONS

This patent application is a divisional of and claims priority from U.S. patent application Ser. No. 09/097,354 filed on Jun. 15, 1998, now abandoned and entitled "Electrical Drive System for Rocket Engine Propellant Pumps", the disclosure of which is hereby incorporated by reference herein in its entirety.

FIELD OF THE INVENTION

The present invention relates in general to systems for pumping a liquid propellant from a propellant tank to a combustion chamber of a rocket engine and, in particular, to an electrical drive system for driving a liquid propellant pump for certain high energy, limited time applications. The invention is particularly applicable for pumping propellant to the combustion chamber of a launch vehicle during a launching thrust time interval.

BACKGROUND OF THE INVENTION

Rocket engines are used in a variety of applications including a number of types of spacecraft thrust systems. Such thrust systems include launch vehicle thrust systems and impulse engines. Launch vehicle thrust systems are used to provide the primary thrust required for inserting a spacecraft into orbit. The thruster systems may be provided in stages that are fired in sequence, with initial stages being discharged when they are exhausted. Each such stage may include one or more rocket engines, i.e., one or more combustion chambers associated with a nozzle or other structure for expelling a combustion product to produce thrust. Each rocket engine of a launch vehicle is generally operated at a high combustion chamber pressure and a high mass flow rate continuously for a limited time duration. In this regard, the launch thrusting period in which such a launch vehicle rocket engine is operated may last, for example, for about 1 to 8 minutes. In order to provide the necessary continuous and high mass flow of propellant from a propellant tank to the combustion chamber during this period a rotating impeller-based pump is typically employed.

By contrast, impulse engines are typically used for a variety of in-orbit, pulsed applications. For example, impulse engines may be operated in-orbit in a closely controlled manner to provide small velocity changes for orbit correction or transfer. Similarly, such impulse engines may be operated in-orbit for attitude control, e.g., to maintain a desired orientation for solar panels and remote sensing or other optical instruments. In such cases, the impulse engines are typically pulsed for shorter time intervals and at much smaller thrust levels, to provide the required impulses for control purposes. Accordingly, a much lower propellant mass flow rate to the impulse engine combustion chambers is typically required, and propellant flow may be discontinuous e.g., pulsed. A variety of propellant pumps can be used in such impulse engine applications including electrical or fueled reciprocating pumps.

Impeller-based pumps including those used for launch vehicle applications have generally been turbine driven. These turbine pumps force propellant at a high mass flow rate into the combustion chamber that generally has a pressure much higher than that of the propellant tank. For certain launch vehicle applications, these turbo pumps may be operated to provide 3,000 horsepower or greater at rotational speeds of 10,000 to 30,000 rpm. The turbine section of these turbo pumps is typically forced to rotate by the ingestion of hot gases from a gas generator system. This gas generator system is normally another small rocket engine, also consuming propellants, to produce the hot exhaust gas that is then ducted into the input of the turbine section of the turbo pump. Such turbo pumps and associated gas generators are costly, complex, massive and require significant monitoring and testing. In particular, the propellants and pressurants needed to power the gas generator contribute to expense, system complexity and overall mass. Moreover, the turbo pump system entails a significant amount of hot gas and high pressure plumbing in the engine feed line area with attendant welds and potential leak paths. Accordingly, such systems require careful construction and monitoring. In addition, complete testing of such systems on the launch pad can only be conducted with propellants onboard. Some such systems, including certain systems that employ a small rocket engine in conjunction with the gas generator, provide limited throttling ability for controlling the rate of propellant delivery. Despite these limitations, such turbo pump systems have been thought necessary for many impeller-based pump systems including those used for launch vehicle applications.

SUMMARY OF THE INVENTION

The present invention relates to an electrical drive system for continuously driving a liquid propellant pump during a thrusting time period. The electrical drive system is thus suitable for rotationally driving an impeller-based pump system and for use in delivering liquid propellant to a launch vehicle thruster during a time period. The invention reduces or substantially eliminates the need for turbine drive systems and associated gas generators, thereby simplifying drive system design, construction and testing and allowing for reduction in overall system cost and mass, while increasing system reliability. The electrical drive system also allows for convenience propellant mass flow rate throttling and various other operational advantages. The electrical drive system may also be employed in other high power, limited duration impeller applications such as torpedo engines.

According to one aspect of the present invention, an electrical drive system is provided for rotationally driving an impeller-based fluid drive unit such as a liquid propellant pump. In the case of a liquid propellant pump of a rocket engine, the pump is operatively interposed between a liquid propellant tank and a combustion chamber of the rocket engine to pump the liquid propellant from the tank to the combustion chamber, and includes a rotating impeller for pumping the propellant. The drive system includes an electric motor with an output shaft for driving the pump, an electrical power source for powering the motor, a controller for regulating current distribution, and linkage for coupling the output shaft of the motor to an impeller shaft of the pump. In the simplest case, the motor and impeller could share a common shaft that serves as the linkage. The electric motor is thereby utilized in conjunction with the pump to pump liquid propellant from the propellant tank to the combustion chamber.

Preferably, the electric motor is a brushless DC motor capable of providing a variable rotation rate to the output shaft. In addition, the electric motor preferably provides a substantially constant torque per amp output over a range of rotation rates of the output shaft for enhanced propellant mass flow rate control. In one embodiment, a number of electric motors are used cooperatively to drive the pump. For example, counter rotating motors may be utilized to reduce or eliminate precessional forces. That is, two or more motors may be used in counter rotating pairs, i.e., rotating in opposite rotational senses.

The electrical power source may include one or more of a high energy density battery, a super capacitor, a fly wheel and a gas generator. Depending on the specific application, in order to provide sufficient power for launch vehicle or other high power, limited duration thrusting applications, the electrical power source may provide at least about 1 megawatt of power during a thrusting time period. Additionally, the electric power source is preferably capable of providing a high power output continuously for a period of at least about 60 seconds. Alternate applications such as upper stages would require less power over shorter periods of time. Moreover, the power source preferably has an energy density of at least about 50 watt hours per kilogram so as to provide adequate power and reduced mass.

The coupling means may include a clutch and/or a mechanism for allowing a rotational and alignment difference as between the motor output shaft and the impeller shaft. In this regard, a clutch may be utilized to selectively disengage the impeller shaft from the motor output shaft as may be desired for testing and other purposes. A gear box, a belt and pulley system, or other suitable mechanism may be provided for stepping up or stepping down the rotation rate between the output shaft and the impeller shaft. Where more than one electric motor is utilized to drive the pump, the linkage may include a mechanism for rotationally coupling each of the electric motors to the impeller shaft. In addition, the linkage may include a resilient disk interposed between the motor output shaft and the impeller shaft to rotationally link the shafts while providing a degree of mechanical resiliency as may be desired.

According to another aspect of the present invention, an electrical drive system is provided for driving a liquid propellant pump of a launch vehicle. As will be readily appreciated, such a pump is typically required to provide a high propellant mass flow rate continuously during a launching thrust period. The electrical drive system comprises a pump disposed in a supply line between a liquid propellant tank and a combustion chamber of a launch vehicle rocket engine for continuously driving the liquid propellant through the supply line towards the combustion chamber during the launching time period, and an electrical drive motor for driving the pump during the launching time period. The pump is preferably an impeller-based pump for providing a suitable propellant mass flow rate during the launching thrust time period.

According to another aspect of the present invention, a method for operating an electric drive pump system is provided. The method includes the steps of disposing a pump in a supply line between a propellant tank and a combustion chamber, where the pump includes a rotating impeller; providing an electrical motor system for driving the pump; linking the electric motor system to the pump so as to electrically drive the pump; and operating the electric motor system to rotate the impeller of the pump. The step of operating preferably involves providing at least 1 megawatt of power to the pump so as to provide an adequate propellant mass flow rate for launching applications. In this regard, the electric motor is preferably operated to provide a high power output to the pump continuously for a period of at least about 90 seconds, such as for a staged booster of a launch vehicle. The step of operating may further involve varying a rotation rate of the electric motor system so as to control a feed rate of the liquid propellant. The electric motor system may include multiple motors. In such a case, the step of linking the motor system to the pump preferably includes linking each of the motors to the pump.

The present invention thus allows an electric drive system to be used in high power, limited duration applications such as continuously supplying a liquid propellant from a propellant tank to a rocket engine combustion chamber during a thrusting time period. The invention can be used in impeller-based pump applications including launch vehicle applications. The present invention thereby reduces or substantially eliminates the need for turbine drive systems and associated gas generators and provides significant operational advantages.

DESCRIPTION OF THE DRAWINGS

For a more complete understanding of the present invention and further advantages thereof, reference is now made to the following detailed description taken in conjunction with the drawings, in which.

DETAILED DESCRIPTION

The electrical drive system and associated methodology of the present invention are particularly applicable to high power, limited duration fluid drive applications such as launch vehicle propellant supply systems and torpedo drive systems. In the following description, the invention is set forth in a context of an impeller-based liquid propellant supply system for launch vehicle applications. However, it will be understood that various aspects of the invention are applicable in a variety of other contexts including certain high power, limited duration applications.

Figure 1:
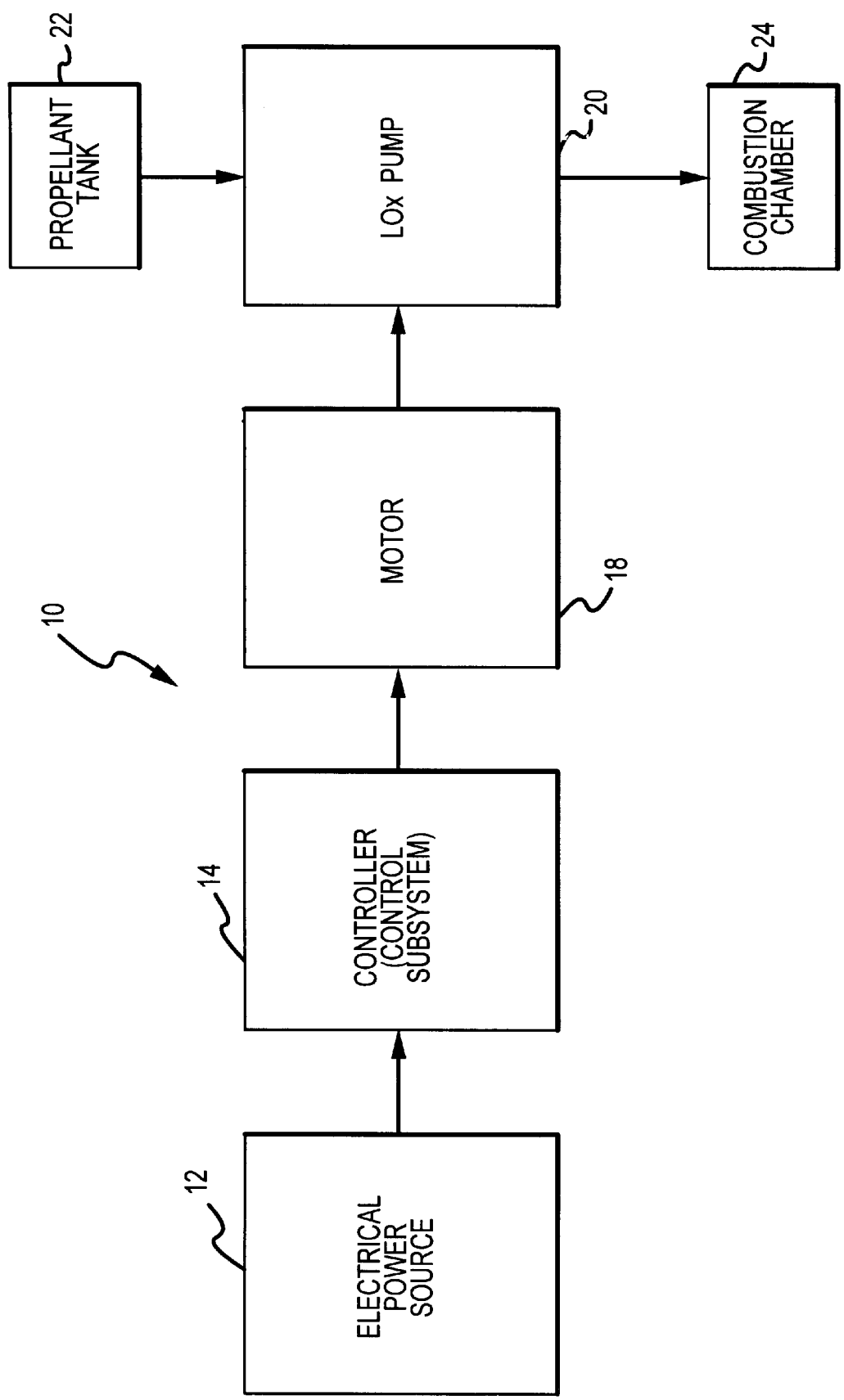
FIG. 1 is a schematic diagram of an electric drive propellant supply system in accordance with the present invention.

FIG. 1 is a schematic diagram of a liquid propellant supply system 10 in accordance with the present invention. The system 10, which may be part of a launch vehicle, is used to provide a flow of liquid propellant from a propellant tank 22 to the combustion chamber 24 of a rocket engine during a thrusting time period, for example, a launching thrust time period. The system 10 can be used to provide a flow of any suitable liquid propellant. Generally, rocket engines include a combustion chamber where a fuel is oxidized to generate a combustion product which is expelled at high speed through a nozzle or other structure to generate thrust. In this regard, some propulsion systems involve separate tanks and separate supply lines for a liquid fuel and a liquid oxidant. In such cases, the supply system of the present invention may be used to supply an oxidant and/or fuel to the combustion chamber. In the illustrated embodiment, the system 10 is used to pump liquid oxygen (LOx) from tank 22 to combustion chamber 24.

The system 10 employs a pump 20 for providing the desired propellant flow. As will be described in greater detail below, in order to provide the continuous, high mass flow rate that is desired for high energy, limited duration applications such as launch vehicle applications, the pump 20 is an impeller-based pump. That is, a rotating impeller is interposed in the propellant supply line to impel the liquid propellant towards the combustion chamber 24. It will be appreciated that a high mass flow rate of the liquid propellant is required throughout the launching thrust time period for launch vehicle applications. In this regard, certain launch booster vehicle applications require the pump 20 to deliver at least about 1,840 hp at operating rates of between about 9,600 to 30,000 rpm for a period of 100 seconds. In such applications, the pump 20 may be required to deliver LOx at a very high mass flow rate, for example, at least about 400 $Lb_m$/sec.

Heretofore, such performance has been provided by using a turbo pump. Such turbo pumps employ a turbine to rotationally drive the shaft of the impeller-based pump. The turbine is typically driven by high temperature gases from a gas generator. The gas generator is typically, itself, a rocket engine that consumes propellants. The propellants are combusted in a combustion chamber to provide a high temperature combustion product which is used to drive the turbine that, in turn, drives the impeller of the pump. It will be appreciated that such systems require substantial high temperature, high pressure plumbing with a significant potential for leaks. In addition, such systems are massive and contribute to overall launch vehicle complexity. Nonetheless, such systems have often been thought necessary in order to provide the desired high mass flow rate of liquid propellant for launch vehicle applications.

The illustrated liquid propellant supply system 10 is electrical in nature and avoids the need for a gas generator and a turbine assembly. In particular, the illustrated system 10 includes: an electrical power source 12; a control subsystem comprised of a controller 14, and a motor 18, for driving the pump 20. The electrical power source 12 provides electrical power sufficient for high power, limited duration applications such as launch vehicle applications as described above. For launch vehicle applications, the power source 12 is preferably capable of providing very high power for at least 60–90 seconds. A number of different types of electrical power sources may be employed in this regard. For example, the power source 12 include high energy density batteries, supercapacitors, or counter rotating flywheels. Specific battery options are disclosed in detail below. Optionally, the batteries may be charged by an onboard gas generator system. In such cases, in order to reduce system complexity, a single gas generator system may be used to energize the batteries associated with the various rocket engines of various rocket stages.

The controller 14 of the present invention controls the delivery and characteristics of the electrical power from power source 12 to the motor 18. In this manner, the operation of the motor 18 may be controlled, for example, to permit throttling of the mass flow rate of the propellant. Such throttling control may be beneficial for a variety of applications as will be apparent to those skilled in the art. The controller 14 which controls the electromagnetic field that is used in generating the electromotive force for motor 18, also utilizes feedback concerning the rate of motor operation.

Various motor types and configurations are described in detail below. The illustrated motor 18 preferably includes at least one brushless DC motor which has been found to provide excellent power as a function of component weight. Preferably the motor 18 provides a substantially constant torque per amp over a wide range of operating speeds. The illustrated motor 18 allows for throttling speed variation from 0 to full speed. The speed of operation is varied under pulse width modulated current control in response to signals from controller 14. The motor 18 includes an output shaft that is rotationally linked to an impeller shaft of the pump 20, as will be described below, in order to rotationally drive the impeller-based pump 20.

Figure 2:
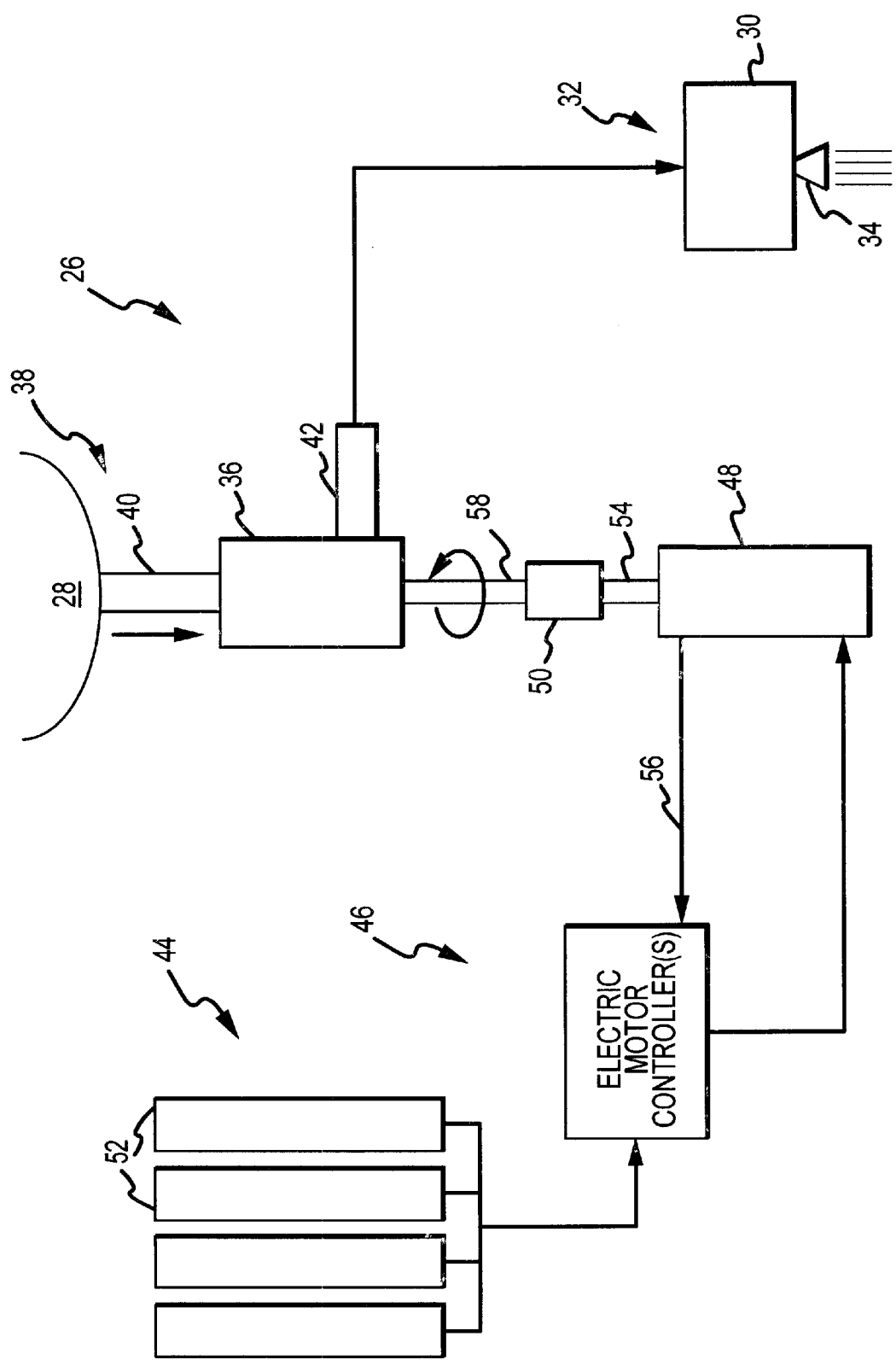
FIG. 2 is a block diagram of one embodiment of an electric drive propellant supply system in accordance with the present invention.
Figure 3:
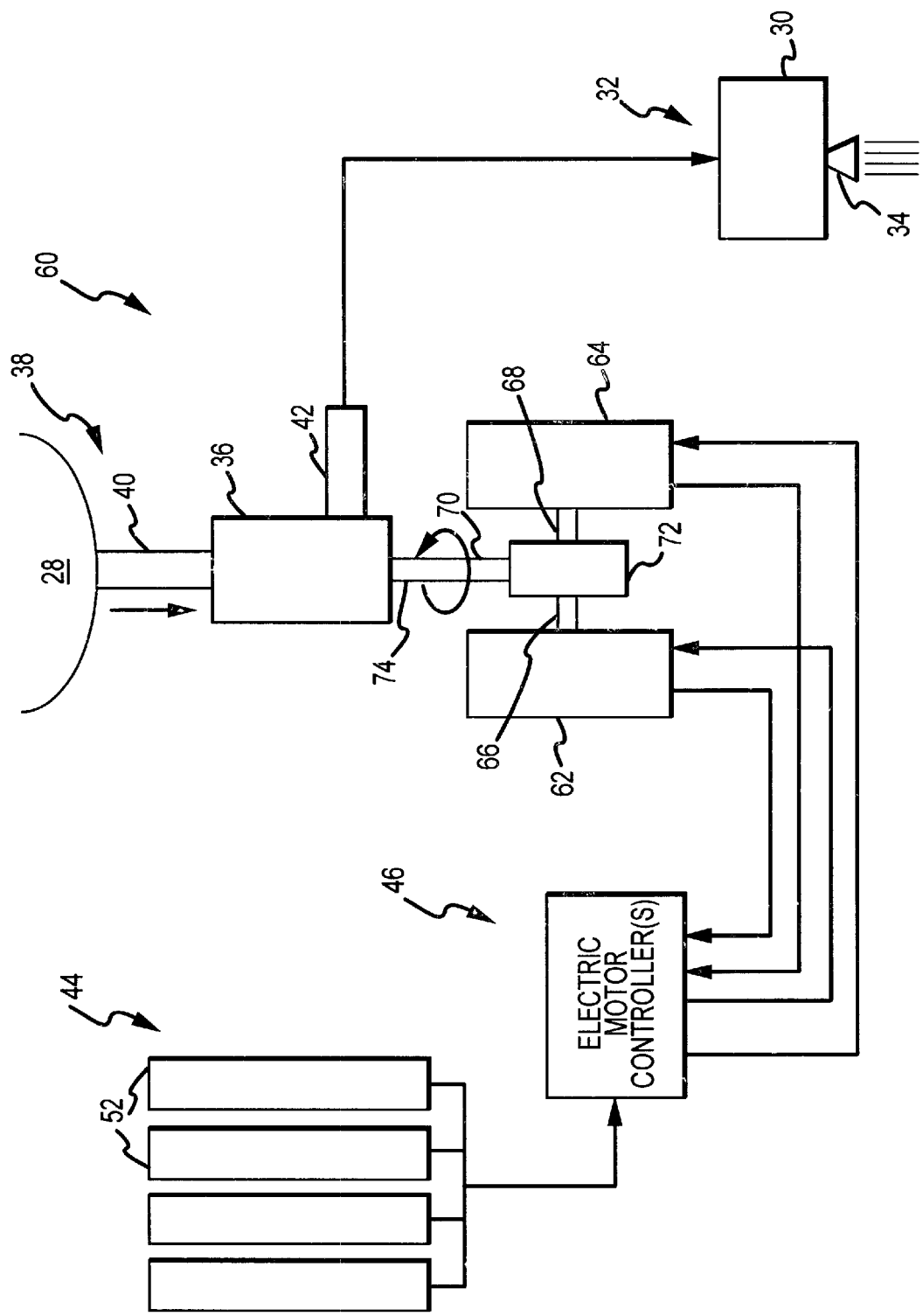
FIG. 3 is a block diagram of another embodiment of the electric drive propellant supply system in accordance with the present invention.

Referring to FIGS. 2 and 3, two alternative electrical drive systems are shown. In particular, FIG. 2 illustrates a single motor embodiment of the drive system whereas FIG. 3 illustrates multiple motor operation. Corresponding elements in FIGS. 2 and 3 are identified by corresponding numerals.

Referring to FIG. 2, a single motor electrical drive system is generally identified by the reference numeral 26. The system is used to deliver liquid propellant from propellant tank 28 to the combustion chamber 30 of rocket engine 32. The liquid propellant is burned in the combustion chamber 30 and the resulting combustion product is discharged through nozzle 34 to produce thrust. An impeller-based, rotary propellant pump 36 is used to impel the liquid propellant through the propellant supply line 38. The supply line 38 includes a low pressure section 40 between the propellant tank 28 and the pump 36 and a high pressure section 42 between the pump 36 and the combustion chamber 30. In this regard, it will be appreciated that the pressure in combustion chamber 30 is much greater than the pressure in propellant tank 28 thereby reducing tank weight and associated cost. The required force and pressure for impelling the liquid propellant from the propellant tank 28 to the combustion chambers 30 is provided by the pump 36.

The illustrated pump 36 is rotationally driven by an electrical drive system including a power supply subsystem 44, a control subsystem 46, an electric motor 48, and linkage 50. The illustrated power supply subsystem 44 includes four high energy density batteries 52. The batteries are interconnected in electrical series for maximum voltage and power. A high energy density is desired to provide the required power output from the batteries 52 with minimal battery mass. Preferably, each of the batteries 52 has an energy density of at least about 50 watt hours per kilogram so as to provide the desired performance with reduced overall mass in relation to conventional turbo pump systems. In this regard, various lithium-type batteries may be employed. The illustrated batteries 52 are thermal batteries rated to provide at least 57 watt hours per kilogram of energy density. Moreover, the batteries can release about one third of their energy in an 80 second time interval.

The control subsystem 46 is interposed between the motor 48 and the power supply subsystem 44 to control operation of the motor 48. The operating rate of the motor 48 can be throttled between 0 rpm and full speed by controlling the current flow from the power supply subsystem 44 to the motor 48. The control subsystem 46 may control the rate of operation of the motor 48 in response to inputs from mission control or preprogrammed instructions. For example, in the case of a launch vehicle booster, the control subsystem 46 may be programmed to maintain an operating rate of 9600 rpm for 100 seconds and then to cease operation. The controller may also be programmed to cut off propellant flow in the case of a malfunction or an aborted launch. In addition to such inputs, the control subsystem 46 also receives feedback from the motor 48 regarding the operating state of the motor. For example, such feedback may be provided by way of a sensor that provides an indication of the motor's operating state, for example, feedback may be provided by way of an encoder or the like mounted on the output shaft 54 of the motor 48. This feedback, generally indicated by the arrow 56, may include information regarding the speed of operation and position (e.g., phase) of the motor 48.

The linkage 50 is used to rotationally couple the output shaft 54 of the motor 48 to an impeller shaft 58 of the pump 36. Such linkage 50 may include a number of elements. For example, a clutch may be provided as part of the linkage 50 to disengage the impeller shaft 58 from the output shaft 54. Such a clutch may be used to allow for testing of the motor 48 without driving the pump 36. In addition, gears, belts and pulleys, or other linkage members may be provided to reverse the rotation direction of the impeller shaft 58 relative to the output shaft 54, or to change the rotation rates as between the shafts 54 and 58. A resilient disk may also be included as part of linkage 50 in order to couple the shafts 54 and 58 while allowing a degree of mechanical resiliency. Such resiliency may accommodate vibrations and differential expansions/contractions and relative shaft misalignments without undue strain.

FIG. 3 shows an alternative electric drive system 60 that employs at least one pair of counter rotating electric motors 62 and 64. It has been recognized that the high operating rates of the motors 62 and 64 in accordance with the present invention may result in significant precessional forces that could effect launch vehicle guidance in the absence of appropriate balancing. Such balancing can be accomplished by providing the motors 62 and 64 in counter rotating pairs. That is, the illustrated motor 62 has a rotation rate that is substantially equal but opposite from the rotation rate of motor 64. In this manner, precessional forces can be substantially balanced. Each of the motors 62 or 64 is associated with an output shaft 66 or 68. The shafts 66 and 68 are coupled to a further output shaft 70 by way of gear box 72 such that both of the motors 62 and 64 contribute to driving shaft 70. Shaft 70 in turn is integral with or rotationally linked to impeller shaft 74 of pump 36. In the embodiment of FIG. 3, the control subsystem 46 receives feedback from both of the motors 62 and 64. Such feedback is used as described above to allow for control of the operating rates of the motors 62 and 64. In addition, such feedback is useful in balancing the precessional forces due to the motor 62 and 64 by maintaining substantially equal but opposite operating speeds.

Figure 4:
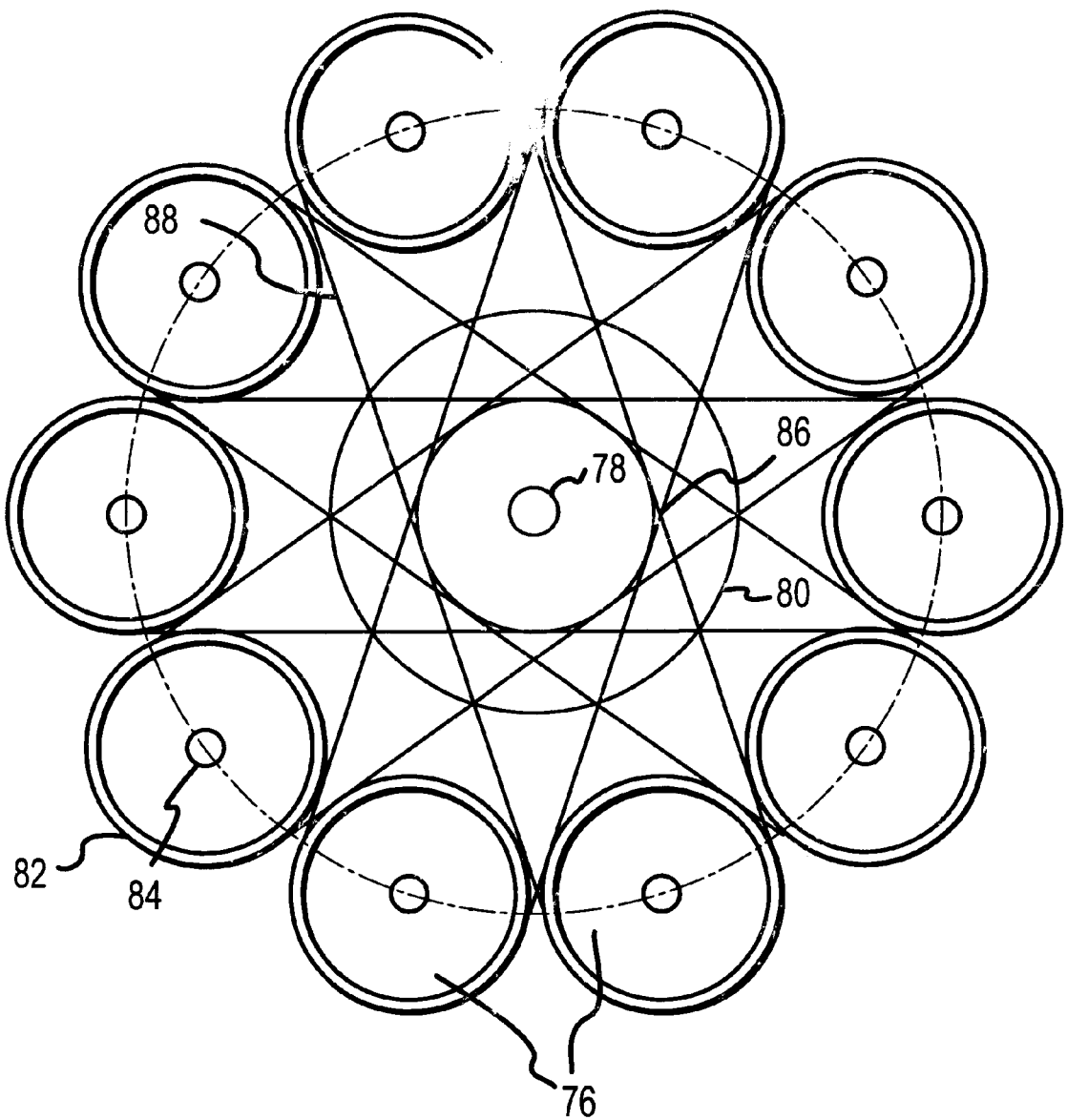
FIG. 4 is a bottom view showing a linkage assembly for linking multiple electric motors to a propellant pump in accordance with the present invention.
Figure 5:
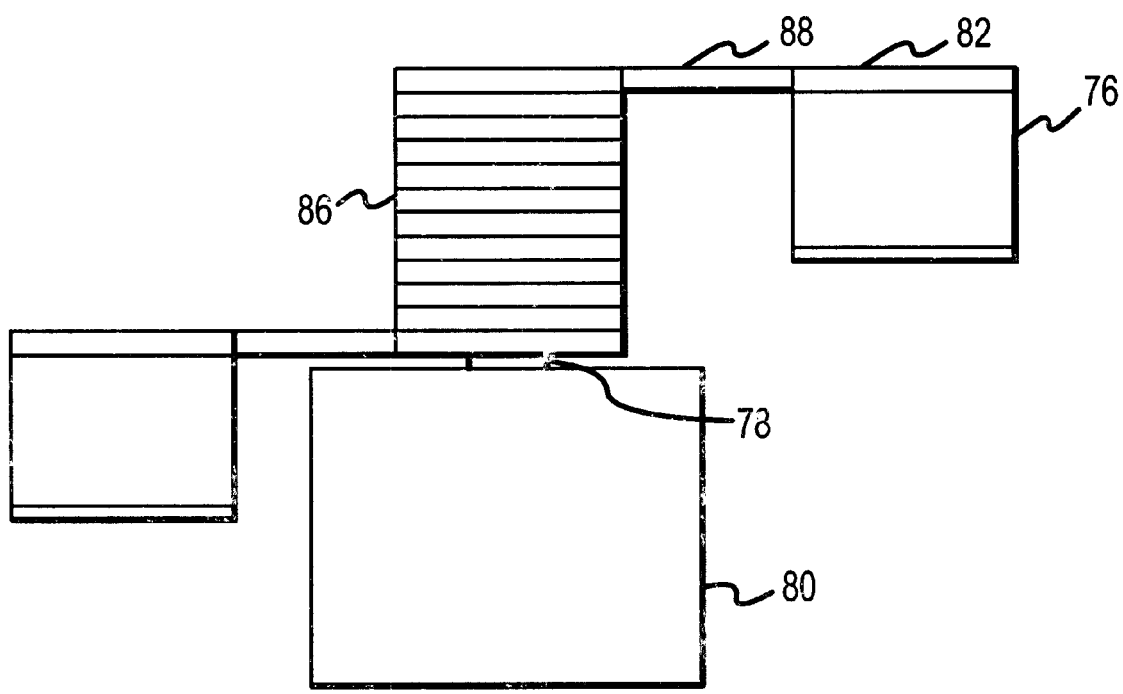
FIG. 5 is a side view showing a portion of the linkage of FIG. 4.

In order to achieve the desired horsepower for driving an impeller-based pump of a launch vehicle or other high energy application, it may be desirable to use multiple motors to drive a propellant supply pump. FIGS. 4 and 5 show an arrangement for employing ten motors 76 to drive the impeller shaft 78 of such a pump 80. Each of the motors 76 is associated with a drive pulley 82. More specifically, the drive pulleys 82 are mounted on output shafts 84 of the motors 76. Similarly, a number of driven pulleys 86 (equal to the number of motors 76) are mounted on the impeller shaft 78. Each of the drive pulleys 82 is rotationally coupled to one of the driven pulleys 86 by way of a drive belt 88. Alternatively, a drive chain, gears, or other driving device may be used. It will be appreciated that only two of the motors 76 are shown in FIG. 5 for clarity of illustration. In this manner, the power from each of the motors 76 is used in driving the pump 80. For example, ten identical 310 horse power motors can be used to provide 3,100 horse power to the pump 80.

Figure 6:
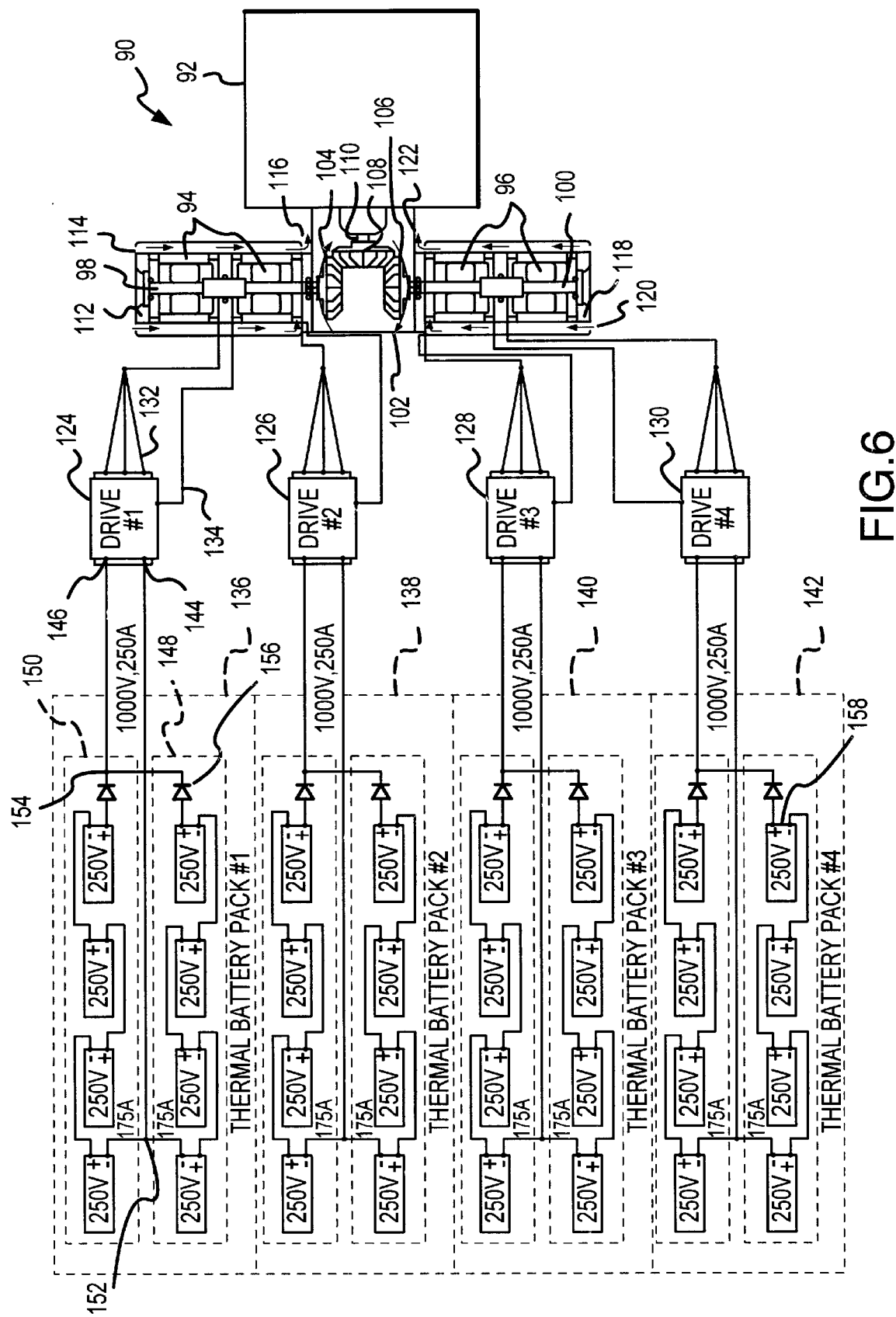
FIG. 6 is a partially schematic diagram showing an electric drive system in accordance with the present invention.

FIG. 6 shows another embodiment of an electrical drive system 90 for driving a liquid propellant pump 92. The system 90 employs two pairs 94 and 96 of counter rotating motors. That is, the first pair 94 of motors has a first rotational sense and the second pair 96 of motors has a second rotational sense opposite that of the first pair 94. The first pair 94 of motors is mounted on a first output shaft 98 and the second pair 96 motors is mounted on a second output shaft 100 that is coaxial with output shaft 98. Within gear box 102 a first bevel gear 104 is mounted on output shaft 98 and second bevel gear 106 is mounted on output shaft 100. Each of the beveled gears 104 and 106 meshes with a third bevel gear 108 mounted on an impeller shaft 110 of pump 92 such that both pairs 94 and 96 of motors contribute to driving the pump 92.

It will thus be appreciated that the second pair 96 of motors has a rotation rate that is equal but opposite to that of first pair 94. Moreover, such rotations are coaxial. Such an arrangement has been found to minimize or substantially eliminate precessional forces that could otherwise interfere with launch vehicle guidance. In the illustrated embodiment, each of the motors is selected to provide a power of 440 horse power at 10,000 rpm. The motors are preferably brushless DC motors employing permanent magnets. For some applications, a fan 112 may be mounted on output shaft 98 so that the motor pair 94 is cooled by way of convective air flow from air intake 114 to air exhaust 116. Similarly, a fan 118 may be mounted on output shaft 100 so that the second pair 96 of motors is cooled convectively by air flow from air intake 120 to exhaust 122.

Each of the motors is controlled by one of the motor controllers 124–130. The controllers 124–130 drive the motors by way of three phase wires 132 per controller 124–130. Drive power is sequentially transmitted via the phase wires 132 to drive the motors through a 360 degree cycle. Each of the controllers 124–130 also receives feedback 134 from the associated motor regarding rate and position. This feedback is useful in synchronizing the control signals and hence the power transmitted via the phase wires 132 and also in monitoring and controlling the operating rates of the motors. Each of the controllers 124–130 may be, for an example, a 350 amp, 1,000 volt motor controller.

The controllers 124–130 are powered by respective thermal battery packs 136–142. The battery packs 136–142 are interconnected to the controllers 124–130 via respectively negative 144 and positive 146 controller terminals. Each of the illustrated battery packs 136–142 includes a pair of battery strings 148 and 150 arranged in parallel. That is, the negative terminal 152 of each string 148 and 150 is connected to the negative terminal 144 of one of the controllers 124–130 and the positive terminal 154 of each string 148 and 150 is connected to the positive terminal 146 of one of the controllers 124–130. High voltage diodes 156 associated with the positive terminal 154 of each string 148 and 150 assure unidirectional current flow.

Each of the illustrated strings 148 and 150 includes four batteries 158 arranged in series. That is, the positive terminal of each battery is connected to the negative terminal of a succeeding battery (or the positive terminal of one of the controllers 124–130) such that the voltages of the batteries 158 within a string 148 or 150 are integrated. The parallel arrangement of the strings 148 and 150 results in integration of the currents of the-strings 148 and 150 of each battery pack 136–142.

In the illustrated embodiment, each of the batteries 158 is a 250 volt battery. Each string 148 or 150 provides 175 A of current at 1,000 v. Accordingly, each battery pack 136–142 supplies power to the corresponding controller 124–130 at 1,000 v and 350 A. Such power is adequate to drive each of the motors at its rated output of 440 horse power at 10,000 rpm. As a result, the pump 92 of the illustrated embodiment can be driven at 1,760 horse power at 10,000 rpm during a launch vehicle booster launching time period of about 92 seconds. Moreover, it is estimated that the total mass of the illustrated electrical drive system can be less than 2000 $Lb_m$ as compared to a mass of about 2433 $Lb_m$ for an appropriate gas generator/turbo pump drive system for the same application. Similarly, systems could be designed to operate at 500 volts, 250 volts, or at other system voltage levels.

The present invention thus provides an electrical drive system that provides a power output sufficient for a variety of high power, limited duration applications including driving a propellant supply pump of a launch vehicle. In such applications, the invention eliminates the need for a turbo pump with an associated gas generator system thereby simplifying pump system design, reducing mass, and simplifying construction, maintenance and testing. Moreover, the electrical drive system of the present invention allows for convenient throttling of the propellant mass flow rate as may be desired.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A drive system for a rocket engine propellant pump of a launch vehicle, the pump being operatively interposed between a liquid propellant tank and a combustion chamber of said rocket engine to pump the liquid propellant from the tank to the combustion chamber during a launch of said launch vehicle away from Earth, the pump including a rotating impeller for pumping the liquid propellant, the impeller being rotatable about an impeller shaft, said drive system comprising:

electric motor means for driving the pump, said electric motor means having an output shaft, said electric motor means comprising a plurality of motors for cooperatively driving said pump, said electric motors providing substantially an entire power required for driving said pump throughout a full operating time period of said pump during said launch;

electric power source means for powering said electric motor; and coupling means for rotationally coupling said output shaft of said electric motor means to the impeller shaft of the pump;

whereby said electric motor means is utilized in conjunction with the pump to transfer the liquid propellant from the propellant tank to the combustion chamber throughout said full operating time period of said pump during said launch.

2. A drive system as set forth in claim 1, wherein said electric motor means plurality of motors comprises at least one pair of counter rotating motors, said pair of counter rotating motors including a first motor having a first sense of rotation and a second motor having a second sense of rotation opposite said first sense, said motors thereby being operative to reduce precessional forces that may affect launch vehicle control.

3. A drive system as set forth in claim 1, wherein said electric motor comprises one of a brushless DC motor, or an AC induction motor.

4. A drive system as set forth in claim 1, wherein said electric motor means provides a variable rotation rate to said output shaft.

5. A drive system as set forth in claim 1, wherein said electric motor means provides a substantially constant torque per amp output over a range of rotation rates of said output shaft.

6. A drive system as set forth in claim 1, wherein said electric power source. means comprises one or more of the following: a high energy density battery, a super capacitor, a fly wheel or a gas generator.

7. A drive system as set forth in claim 1, wherein said electric power source means comprises a battery for providing at least about 1,000 kilowatts of power during a thrusting time period.

8. A drive system as set forth in claim 1, wherein said electric power source means comprises means for providing a high power output continuously for a period of at least about 60 seconds.

9. A drive system as set forth in claim 1, wherein said electric power source means comprises means for providing an energy density of at least about 50 watt hours per kilogram.

10. A drive system as set forth in claim 1, wherein said coupling means comprises a mechanism for allowing a rotational difference between said output shaft and said impeller shaft.

11. A drive system as set forth in claim 1, wherein said means for rotationally coupling comprises means for linking each of said plurality of electric motors to said impeller shaft.

12. A drive system as set forth in claim 1, further comprising a controller for controlling operation of said electric motor means.

13. An apparatus for supplying a liquid propellant from a propellant tank to the combustion chamber of a launch vehicle rocket engine of a launch vehicle via a supply line during a launching thrust time period wherein said launch vehicle is launched away from Earth, said apparatus comprising:

a pump, associated with said supply line between said propellant tank and said combustion chamber, for continuously driving the liquid propellant through the supply line towards said combustion chamber during said launching time period in which said launch vehicle is launched away from Earth ; and electrical drive motor means, operatively associated with said pump, for driving said pump free from assistance by any turbine drive system, said pump including a rotating impeller for pumping the liquid propellant, the impeller being rotatable about an impeller shaft throughout an entirety of said launching time period in which said launch vehicle is launched away from Earth, wherein said electrical drive motor means comprises at least one pair of counter rotation motors, said pair of counter rotating motors including a first motor having a first sense of rotation and a second motor having a second sense of rotation opposite said first sense.

14. An apparatus set forth in claim 13, further comprising said means for linking said electric motor means to said pump.

15. An apparatus set forth in claim 13, wherein said electrical drive motor means further comprises electrical power source means wherein said electrical power source means comprises one or more of the following: a high energy density battery, a super capacitor, a fly wheel or a gas generator.

16. An apparatus set forth in claim 15, wherein said electrical power source means comprises a battery for providing at least about 1,000 kilowatts of power during a thrusting time period.

17. An apparatus set forth in claim 15, wherein said electric power source means comprises means for providing a high power output continuously for a period of at least about 60 seconds.

18. A method for supplying a liquid propellant from a propellant tank to the combustion chamber of a rocket of a launch vehicle during launch of said launch vehicle away from Earth, comprising the steps of:

disposing a pump in a supply line between the propellant tank and the combustion chamber, the pump having a rotating impeller for impelling the liquid propellant from the propellant tank to the combustion chamber;

providing an electric motor system including a controller for driving the pump;

linking the electric motor system to the pump such that only the electric motor system is capable of driving the pump during said launch;

operating the electric motor system in a controlled fashion to rotate the impeller of the pump wherein said electric motor system includes a plurality of electric motors and said step of linking comprises linking each of the plurality of motors to the pump.

19. A method as set forth in claim 18, wherein the step of operating the electric motor system comprises varying a rotation rate of the electric motor system so as to control a feed rate of said liquid propellant from said tank to said combustion chamber.

20. An method as set forth in claim 18, wherein said step of operating the electric motor system comprises providing at least about 1,000 kilowatts of power to the pump.

21. An method as set forth in claim 18, wherein said step of operating comprises providing a high power output to said pump continuously for a period of at least about 60 seconds.

22. An method as set forth in claim 18, wherein said rocket comprises a launch vehicle thruster and step of operating comprises delivering a continuous supply of said liquid propellant to said combustion chamber during a thrusting time period.

* * * * *

UNITED STATES PATENT AND TRADEMARK OFFICE
CERTIFICATE OF CORRECTION

PATENT NO.    : 6,457,306 B1
DATED         : October 1, 2002
INVENTOR(S)   : Abel et al.

It is certified that error appears in the above-identified patent and that said Letters Patent is hereby corrected as shown below:

Column 10,
Line 9, after the word "source", delete the ".";
Line 46, delete "Earth ;" and insert therefor "Earth:";
Line 60, delete the first occurrence of "said".

Signed and Sealed this

Fourth Day of February, 2003

JAMES E. ROGAN
*Director of the United States Patent and Trademark Office*